Nov. 8, 1960   S. C. PLETTNER   2,958,971
SLIDE HOLDERS FOR HOLDING SLIDE MOUNTS
Filed Jan. 12, 1959
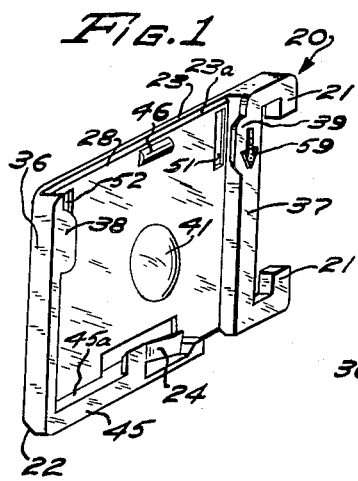
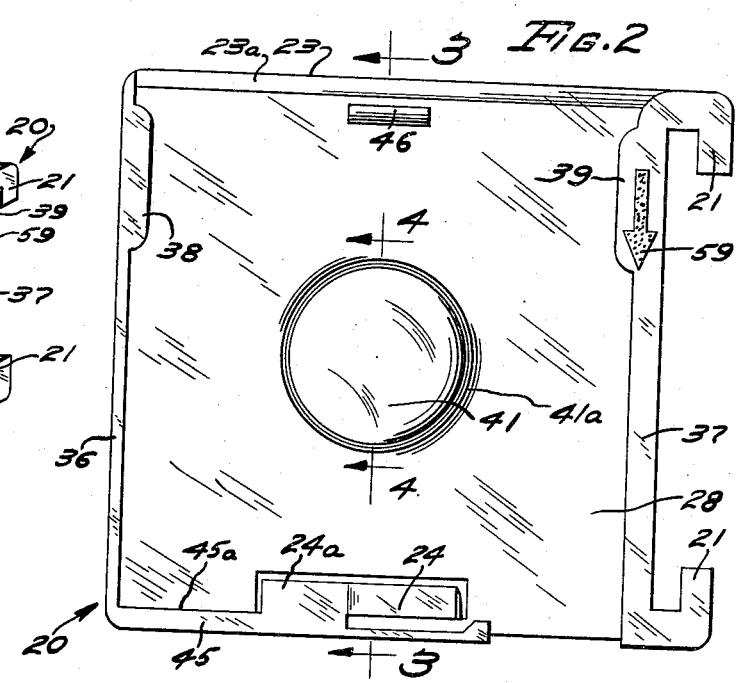
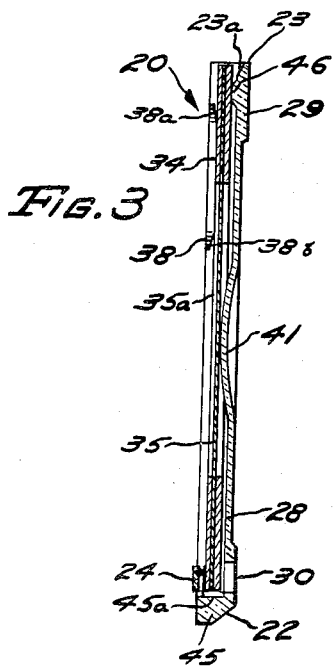
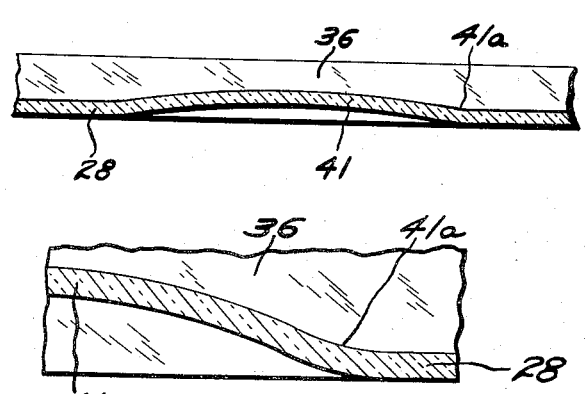
Inventor
Stuart C. Plettner
By Robert F. Miehle, Jr.
Atty.

2,958,971
Patented Nov. 8, 1960

2,958,971

SLIDE HOLDERS FOR HOLDING SLIDE MOUNTS

Stuart C. Plettner, Evanston, Ill., assignor to Bell & Howell Company, Chicago, Ill., a corporation of Illinois Filed Jan. 12, 1959, Ser. No. 786,374

7 Claims. (Cl. 40—152)

This invention relates to slide holders for holding slide mounts, and more particularly to slide holders for use in slide projectors having automatic slide changers.

An object of the invention is to provide new and improved slide holders.

Another object of the invention is to provide a slide holder adapted to hold a slide in a position in which the emulsion side of the slide is in the aperture focal plane of a slide projector when the slide holder is in the projector.

Another object of the invention is to provide slide holders covering slides to keep dust from the slide.

Further objects and features of the invention will be apparent from the following detailed description of a slide holder forming a specific embodiment thereof, when read in conjunction with the appended drawings, in which:

Fig. 1 is a perspective view of a slide holder forming one embodiment of the invention;

Fig. 2 is an enlarged front elevation view of the slide holder of Fig. 1;

Fig. 3 is an enlarged vertical sectional view taken along line 3—3 of Fig. 2;

Fig. 4 is an enlarged vertical sectional view of a portion of the slide holder of Fig. 1 and turned ninety degrees; and Fig. 5 is a greatly enlarged view similar to Fig. 4.

The invention provides a slide holder adapted to receive a card mounted slide. The holder preferably is of one piece and includes a transparent panel having a central bulge-like bubble or embossment for holding the film of the slide so as to locate the emulsion side of the film precisely relative to the holder so that, when the holder is placed in projecting position in a slide projector, the emulsion side of the film is located precisely in a plane for projection without change when the film is heated by the projection light. The slide holder preferably has a guideway open at the top for insertion of and removal of a slide mount into and from the holder while the holder is in the projecting station in a slide projector to permit editing. The guideway may include hooks or tabs spaced from the peripheral portion of the panel mount into the projector while holding the mount against the peripheral portions of the panel so that the bubble bears against or is very near to the transparency. The panel is thin and the bubble is very gently curved so as to have negligible optical effect.

Referring now in detail to the drawings, there is shown in Figs. 1 to 4 a slide holder 20 of one piece and formed of transparent molded plastic material such as, for example, methyl methacrylate or polymerized styrene. The slide holder permits insertion and removal of a slide mount 34. The slide holder includes a pair of thick, strong hooks or interlocking members 21 for pulling the holder from a tray and pushing the holder back into the tray by a pulling mechanism of a slide projector disclosed and claimed in copending application Serial No. 799,404 for "A Slide Projector" and assigned to the same assignee as the instant application. The holder has a bevelled or relieved lower edge 22 (Fig. 3) and the receiving septum of the tray is formed complementary thereto and the upper edge 23 of the holder is unrelieved so that the holder cannot be inserted into the tray backwards. The holder also has an integral leaf spring finger 24 projecting outwardly from the front side of the holder to press against the septum to retain the holder in the tray even when the tray is tipped to a position which would spill other types of holders from the tray. The tray is disclosed and claimed in copending application Serial No. 786,294 for "Slide Tray and Slide Holder" and assigned to the same assignee as the instant application. Certain features of the slide holder 20 are disclosed and claimed in copending application Serial No. 786,199 for "Slide Holders for Holding Slide Mounts and Making the Same."

The slide holder has a panel or cover 28 forming the back face of the holder, and the panel is thinner than top and bottom marginal portions 29 and 30 of the panel as best illustrated in Fig. 3, the edge portions being thick to provide strength to the holder while the panel is thin to provide a substantially negligible thickness from the optical standpoint. The holder has a guideway 33 for a cardboard slide mount 34 (Fig. 3) of known construction and mounting a transparency or film 35 having a front or emulsion side 35a. The guideway 33 is formed by the marginal portions 29 and 30 of the panel 28, side edge portions 36 and 37 of the holder and overhanging tabs 38 and 39. The tabs 38 and 39 have tapered or relieved entrance and exit portions 38a and 38b.

The portions of the front and rear faces of the panel 28 which are coextensive with the transparency 35 are plano except for a centrally located focus locking, bulge-like, embossment or bubble 41 of the panel extending forwardly from the front face of the panel 28. The front and rear surfaces of the bubble 41 are spherical, have very large radii and are substantially parallel so as to have negligible optical effect. The bubble blends very gently into the plano portions of the panel at 41a, and is of the same thickness as that of the plano portions. The bubble 41 is adapted to hold the slide transparency or film 35 toward the left or front of the holder, as viewed in Fig. 3, to precisely position the emulsion side of the film in the focal plane of the projector. The slide holder is adapted to hold slides of various sizes of film frame, and the chordal dimension of the bubble is substantially less than that of the smallest film frame. Since the bubble 41 and the panel 28 are very close to the focal plane or depth of field during projection, the curves of the bubble are made very large and the reverse curves of the blend area 41a also are made very large so that the bubble has no detectable optical effect. Another feature of the bubble is that no portion of its surfaces is at a substantial angle relative to the plano surfaces of the panel and the thickness of the bubble and blend 41a are the same as or slightly less than the thickness of the plano portions of the panel 28, which causes the light path to be uniform through all portions of the panel, bubble and blend. The large curves of the bubble and blend also prevent the slide mount from catching on the bubble when the slide mount is slid into or out of the slide holder.

There are three types of mounted slides having widespread use. In one, the film bulges to the left, as viewed in Fig. 3, at room temperatures and then when heated by the projection light normally pops to the right. At room temperature of the film of this type of slide, the bubble 41 either engages the film or is in such close proximity thereto that the bubble holds the film against any appreciable movement of the film relative to the holder. In the second type of slide, the film at room temperature normally bulges to the right if unrestrained and then pops over to the left when heated during projection.

With the latter type of slide, the bubble 41 pre-pops or pre-stresses the film at room temperatures over to the left so that the film does not move appreciably when heated during projection. In the third type of slide, the film normally bulges to the right and remains in that position even when heated. With this type of slide, the bubble pushes the film slightly to the left of center and holds the film in this latter position throughout so that this film also is held in focus during projection. Thus, the bubble eliminates popping and holds the emulsion side 35a of the film in a precise position relative to the mount and slide holder. The tabs 38 and 39 and a tab or base portion 25 are spaced in front of the front face of the panel sufficiently far that the mount 34 may be slid freely between the tabs and the plano portions of the panel. The tabs 25, 38 and 39 are sufficiently close to the front face of the panel to locate the transparency 35 against or near to the bubble 41 depending on which type of slide is being held. As illustrated in Fig. 3, the tabs 38 and 39 are spaced from the face of the panel a slightly greater distance than the thickness of the cardboard mount 34 to facilitate passage of the mount between the panel and the tabs 38 and 39. The tab 24a is spaced from the opposed portion of the panel 28 just the thickness of the cardboard mount and the upper edge of the tab 24a is beveled to guide the mount into position between the tab 24a and the panel 28.

The portions 29 and 30 and the thick portion adjacent to the edge portion 37 overhang the panel 28 and keep the panel out of contact with the guideway of the projector and the septum walls of the tray. This not only reduces friction but also prevents rubbing of the thin portion of the panel which is the only portion thereof through which the light of the projector travels and is slightly more than coextensive with the transparency 35. The panel covers the transparency to keep dust therefrom as well as prestressing the transparency. The slide holder 20 has a slightly raised textured arrow portion 59 (Fig. 2) to indicate the direction of the slides and also readily identify the top of the slide holder.

In one constructed embodiment of the invention, the thickness of the panel 28 was about thirty thousandths of an inch, the radius of the concave back face of the bubble 41 was three inches, the radius of the convex forward surface of the bubble was about three and thirty thousandths inches, the radius of the concave surface of the blend 41a was about one inch, that of the rear convex surface of the blend 41a was about thirty thousandths of an inch greater than that of the front surface thereof, the bubble projected twenty thousandths of an inch forwardly of the plano portions of the front face of the panel, the spacing of the tabs 38 and 39 from the front face of the panel was about fifty-five thousandths of an inch, the spacing of the tab 24a from the panel slightly greater than forty-one thousandths of an inch at the base of the tab 24a, and the chordal diameter of the bubble was about five-eighths of an inch.

While the invention is thus described, it is not wished to be limited to the precise details described, as changes may be readily made without departing from the spirit of the invention.

What is claimed is:

1. In a slide holder, a one-piece plastic member having a single transparent panel portion and also including edge portions projecting laterally beyond one face of the panel portion, the member also having tabs extending from the edge portions in positions spaced from and generally parallel to the panel portion to coact with the panel portion to hold a slide mount therebetween, the panel portion having a central embossment projecting into the slide mount and holding a film carried by the mount in a focused position.

2. A slide holder comprising a one-piece molded element of transparent plastic material, the element including a single vertical panel of a predetermined thickness having a central gently curved generally spherical bulge projecting from the front thereof, the element having holding means spaced from the front face of the panel and projecting over the front face of the panel to hold a slide mount in a position pressing a film carried by the mount against the bulge to prestress the film.

3. In a slide holder, a transparent panel having a central projecting bubble and plano portion of a predetermined thickness surrounding the bubble, the bubble having spherical surfaces and being no greater in thickness than that of the plano portion, the bubble and the plano portion being blended together by an annular portion reversely curved relative to the bubble, and means holding a slide mount carrying a film in a position adjacent to the face of the panel from which the bubble projects, whereby the bubble locks the film in focus during projection.

4. In a slide holder, frame means, a single transparent panel supported by the frame means and having a bubble projecting from one face thereof, and means carried by the frame means and extending over only a frame portion of a slide mount to hold the frame portion against the frame means to locate the slide mount in a position in which a film carried by the mount is locked in focus by the bubble when the holder is in a projecting position.

5. In a slide holder, frame means, tab means coacting with the frame means to define a guideway into which a slide mount carrying a film may be slid, and a single transparent panel supported by the frame means in a position at one side of the guideway, the panel having a spherically curved bubble projecting toward the film for limiting movement of the film when the film is heated during projection.

6. In a slide holder, a frame portion for holding a slide mount, and a transparent panel portion secured to the frame portion and having a concavo-convex central portion projecting into the transparency opening in a slide mount, the central portion being blended gently into the portion of the panel surrounding the central portion and also being substantially less in chordal diameter than the width of the transparency opening in the slide mount.

7. In a slide holder for holding a slide mount having a central transparency opening having a predetermined width and a predetermined length, a transparent panel member having a central spheroidal embossment and a substantially plano edge portion blended gently into the embossment, the embossment being substantially less in chordal diameter than the width of the transparency opening in the mount and projecting into the opening.

References Cited in the file of this patent

UNITED STATES PATENTS

| 2,153,149 | Mac Harg | Apr. 4, 1939 |
| 2,527,765 | Roehrl | Oct. 31, 1950 |
| 2,797,513 | Edwards | July 2, 1957 |
| 2,823,472 | Waller | Feb. 18, 1958 |
| 2,863,244 | Lyon | Dec. 9, 1958 |
| 2,837,851 | Wilkund | June 10, 1958 |